US012055936B2

United States Patent
Gregg et al.

(10) Patent No.: US 12,055,936 B2
(45) Date of Patent: Aug. 6, 2024

(54) AUTONOMOUS RIDESHARE REBALANCING

(71) Applicant: Toyota Research Institute, Inc., Los Altos, CA (US)

(72) Inventors: Christopher Gregg, Mountain View, CA (US); Brandon D. Northcutt, Arlington, MA (US); Yasuyuki Kohaya, Mountain View, CA (US); Stephen Hughes, Palo Alto, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 226 days.

(21) Appl. No.: 16/442,856

(22) Filed: Jun. 17, 2019

(65) Prior Publication Data

US 2020/0393835 A1 Dec. 17, 2020

(51) Int. Cl.
*G05D 1/00* (2024.01)
*G01C 21/34* (2006.01)
(Continued)

(52) U.S. Cl.
CPC ......... *G05D 1/0212* (2013.01); *G01C 21/343* (2013.01); *G05D 1/0088* (2013.01); *G06Q 10/02* (2013.01); *G06V 20/56* (2022.01); *G08G 1/0112* (2013.01); *G08G 1/0116* (2013.01); *G08G 1/0125* (2013.01); *G05D 1/0248* (2013.01);
(Continued)

(58) Field of Classification Search
CPC .......... G05D 1/212; G05D 1/88; G05D 1/248; G05D 1/255; G05D 1/257; G01C 21/343; G06K 9/791; G06Q 10/02; G08G 1/112; G08G 1/116; G08G 1/125
See application file for complete search history.

(56) References Cited

U.S. PATENT DOCUMENTS

| 6,474,683 | B1 * | 11/2002 | Breed | G01S 7/417 |
| | | | | 701/45 |
| 6,513,833 | B2 * | 2/2003 | Breed | G01S 17/88 |
| | | | | 180/272 |

(Continued)

FOREIGN PATENT DOCUMENTS

| WO | 2007050406 A1 | 5/2007 |
| WO | 2008060689 A2 | 5/2008 |

OTHER PUBLICATIONS

"The Car That Parks Itself," URL: https://www.economist.com/science-and-technology/2013/06/29/the-car-that-parks-itself, Jun. 29, 2013.

(Continued)

*Primary Examiner* — Jess Whittington
*Assistant Examiner* — Terry C Buse
(74) *Attorney, Agent, or Firm* — Dinsmore & Shohl LLP (57) ABSTRACT

A vehicle includes an electronic control unit that includes a processor; and one or more processor-readable instructions; and an occupant detection sensor configured to output a signal indicative of a presence of an occupant. When executed by the processor, the one or more processor-readable instructions cause the vehicle to: record a route from a first location to a second location, and autonomously return to the first location from the second location using the recorded route based on the signal received from the occupant detection sensor.

20 Claims, 5 Drawing Sheets

(51) Int. Cl.
    *G06Q 10/02* (2012.01)
    *G06V 20/56* (2022.01)
    *G08G 1/01* (2006.01)

(52) U.S. Cl.
    CPC ......... *G05D 1/0255* (2013.01); *G05D 1/0257* (2013.01)

(56) References Cited

U.S. PATENT DOCUMENTS

| | | | | |
|---|---|---|---|---|
| 9,599,482 | B2* | 3/2017 | Maise | G08G 1/148 |
| 9,740,204 | B2 | 8/2017 | Yamamura et al. | |
| 9,950,708 | B1* | 4/2018 | Cullinane | G06V 20/56 |
| 10,007,263 | B1 | 6/2018 | Fields et al. | |
| 10,576,893 | B1* | 3/2020 | Salter | G03B 21/2033 |
| 2003/0234524 | A1* | 12/2003 | Roychoudhury | B60R 21/01548 280/735 |
| 2009/0132128 | A1* | 5/2009 | Marriott | B60R 22/48 701/45 |
| 2012/0143409 | A1 | 6/2012 | Curtis et al. | |
| 2013/0030645 | A1* | 1/2013 | Divine | B60K 35/00 709/217 |
| 2014/0031010 | A1* | 1/2014 | Wuergler | H04W 4/80 455/418 |
| 2014/0309864 | A1* | 10/2014 | Ricci | B60N 2/0244 701/36 |
| 2015/0088360 | A1 | 3/2015 | Bonnet et al. | |
| 2016/0174334 | A1* | 6/2016 | Anthony | H05B 47/105 315/153 |
| 2016/0249191 | A1* | 8/2016 | Avrahami | H04W 4/12 |
| 2016/0264132 | A1* | 9/2016 | Paul | B62D 15/0285 |
| 2018/0012151 | A1* | 1/2018 | Wang | G06Q 10/08 |
| 2018/0050575 | A1* | 2/2018 | Campbell | G01N 33/004 |
| 2018/0072345 | A1 | 3/2018 | Nicodemus et al. | |
| 2018/0112993 | A1* | 4/2018 | Schpok | G01C 21/3664 |
| 2018/0181128 | A1 | 6/2018 | Urano | |
| 2018/0194344 | A1* | 7/2018 | Wang | B62D 15/0285 |
| 2018/0321674 | A1* | 11/2018 | Chase | G01C 21/3492 |
| 2018/0341274 | A1* | 11/2018 | Donnelly | G08G 1/0137 |
| 2018/0354502 | A1* | 12/2018 | Yaldo | B62D 15/0285 |
| 2018/0362024 | A1 | 12/2018 | Ernesti et al. | |
| 2019/0011931 | A1* | 1/2019 | Selvam | G05D 1/0088 |
| 2019/0086916 | A1* | 3/2019 | Choi | G08G 1/09 |
| 2019/0202347 | A1* | 7/2019 | Salter | B60Q 1/50 |
| 2019/0389578 | A1* | 12/2019 | Lim | H04W 4/029 |
| 2020/0184669 | A1* | 6/2020 | Stent | G06T 7/70 |
| 2020/0341468 | A1* | 10/2020 | Arima | G05D 1/0088 |
| 2020/0342763 | A1* | 10/2020 | Arima | G06Q 10/02 |

OTHER PUBLICATIONS

Alex Wallar, et al., "Vehicle Rebalancing for Mobility-On-Demand Systems With Ride-Sharing," URL: http://alonsomora.com/docs/18-wallar-iros.pdf., Jan. 18, 2019.

* cited by examiner

AUTONOMOUS RIDESHARE REBALANCING

TECHNICAL FIELD

The present specification generally relates to autonomous vehicles and, more specifically, to the rebalancing of autonomous vehicles among various locations based on an occupancy status of the vehicle.

BACKGROUND

A user may use a vehicle to travel from a starting location to a destination location, but may not necessarily need the vehicle for a return trip from the destination location back to the starting location. In such an instance, the vehicle used to travel from the starting location to the destination location may be less likely to be used again, especially if the user drove the vehicle from an area of dense traffic to an area of relatively lower traffic density. Accordingly, a need exists for vehicles that can autonomously travel from a place to where they have been driven to an area where utilization of the vehicle is more probable.

SUMMARY

In one embodiment, a vehicle includes an electronic control unit including: a processor; and one or more processor-readable instructions; and an occupant detection sensor configured to output a signal indicative of a presence of an occupant. When executed by the processor, the one or more processor-readable instructions cause the vehicle to: record a route from a first location to a second location, and autonomously return to the first location from the second location using the recorded route based on the signal received from the occupant detection sensor.

In another embodiment, a system includes an electronic control unit including: a processor; and one or more processor-readable instructions; and an occupant detection sensor configured to output a signal indicative of a presence of an occupant. When executed by the processor, the one or more processor-readable instructions cause the vehicle to: record a route from a first location to a second location, and autonomously return to the first location from the second location using the recorded route based on the signal received from the occupant detection sensor.

In yet another embodiment, a method of autonomously moving a vehicle from a second location to a first location includes capturing image data of the external environment and vehicle data as the vehicle travels from the first location to the second location using a camera; determining an occupancy status of the vehicle at the second location; processing the image data to determine a route from the second location to the first location; and autonomously travelling from the second location to the first location using the processed image data and the vehicle data based on an occupancy status of the vehicle at the second location.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Drivers may drive a vehicle from a starting location to a destination location. As the vehicle travels, it may collect data. In some instances, the vehicle may collect sufficient data to return from the destination location to the starting location autonomously. Moreover, the vehicle may be configured to determine when the driver has exited the vehicle, thus ensuring that the vehicle does not proceed back to the starting location before a particular driver has finished using the vehicle.

For example, vehicles may include occupant detection sensors that may detect the driver or other passenger. The occupant detection sensor may be, for example, a weight sensor, a camera (e.g., a visual camera or a thermal camera), or other device capable of detecting an occupant. The vehicle may utilize the occupant detection sensor to determine when it is ready to return to the starting location. For example, the driver may be finished with the vehicle when he or she has reached their destination.

Additionally, vehicles may be more useful in some locations than other locations. For example, in relatively sparsely populated suburban residential areas, the potential that a driver or other passenger may need a vehicle to commute to a destination location may be less as compared with a densely populated urban area (e.g., near a stadium or concert venue). Thus, the chance that a vehicle will be hired to take a passenger from a more populated urban area toward a less populated suburban area is greater. Accordingly, if a vehicle can autonomously return from a less populated area to a more densely populated area, its rate of utilization may increase.

Figure 1:
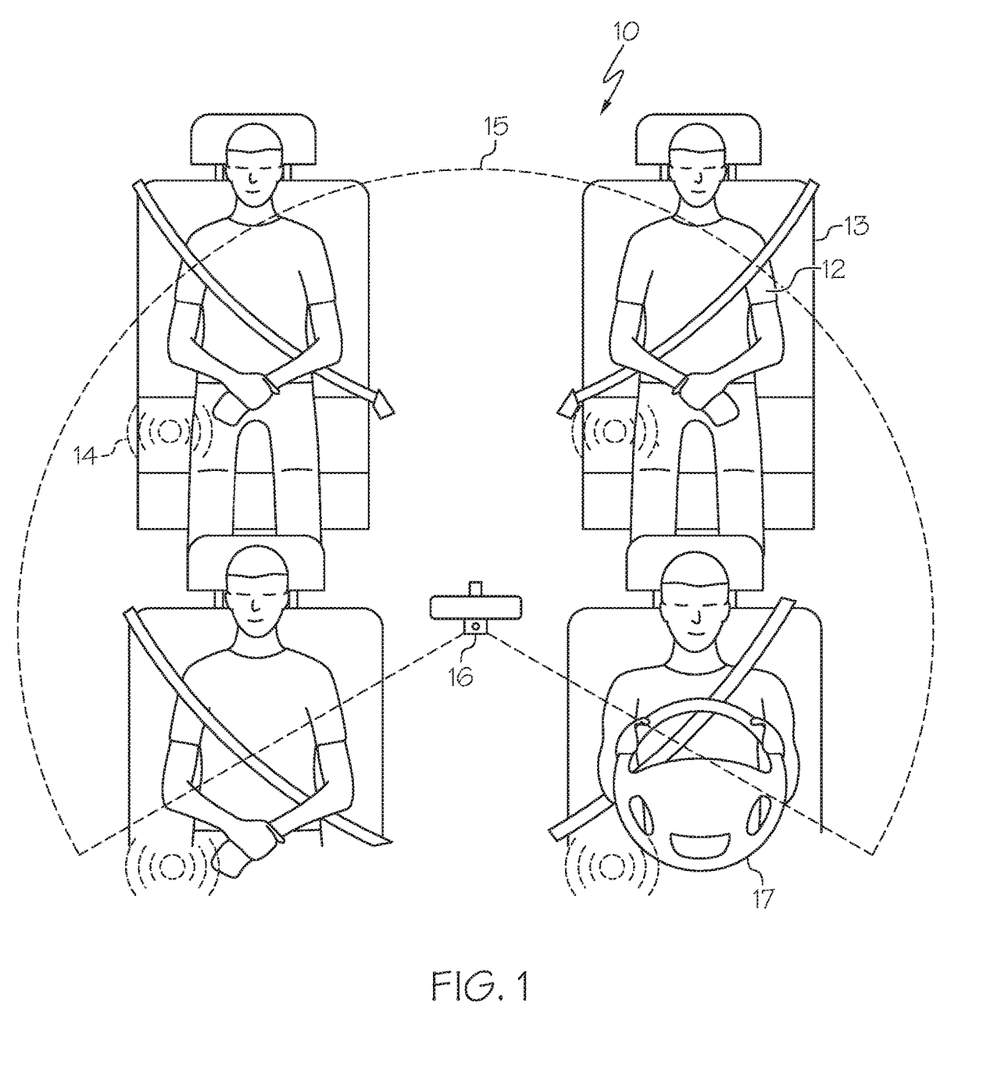
FIG. 1 schematically depicts an illustrative embodiment of a vehicle that is configured to operate autonomously and includes at least one occupant detection sensor according to one or more embodiments shown and described herein.

Referring now to FIG. 1, passengers in an exemplary vehicle 10 are depicted. The vehicle 10 is configured to operate autonomously. The vehicle 10 includes four passengers 12, but it is to be understood that the number of passengers 12 is not limited by this disclosure and that embodiments could be configured to operate with any number of passengers in the vehicle 10. The passengers 12 are each seated in a seat 13 of the vehicle 10 that includes an occupant detection sensor 14. The vehicle 10 may also include a camera 16 with a field of view (FOV) 15 that is configured such that the camera 16 may capture images of an interior of the vehicle 10. Data captured by the camera 16 may be used, for example, to determine an occupancy status of the vehicle 10. One or more autonomous functions of the vehicle 10 may be performed based on the occupancy status (e.g., the vehicle may return to a first location from a second location) as explained in greater detail herein. Some embodiments of the vehicle 10 do not include the occupant detection sensors 14 or the camera 16.

Still referring to FIG. 1, the vehicle 10 may be configured to operate autonomously and manually, such as, by operating a steering wheel 17 to steer one or more wheels of the vehicle 10. One or more of the passengers 12 may operate the vehicle 10 from a first location to a second location and the vehicle 10 may track the location of the vehicle 10 and record the route from the first location to the second location using one or more of the features described herein. Once the vehicle 10 is at the second location, one or more of the passengers 12 may exit the vehicle 10 and the occupant detection sensor 14 and/or the camera 16 may be used to determine an occupancy status of the vehicle 10. Based on the occupancy status (e.g., if there are no occupants in the vehicle 10), the vehicle 10 may autonomously return to the first location from the second location (e.g., by redriving the route from the first location to the second location). For example, in some embodiments, the vehicle 10 may be a rideshare or a rental vehicle or other vehicle that is not primarily owned and/or operated by any of the passengers 12 (e.g., that is merely temporarily hired for relatively short trips) and that may autonomously travel to the first location from the second location when the passengers 12 that hired the vehicle 10 to travel to the second location from the first location no longer have use for the vehicle 10 (e.g., they have reached their intended destination). It is to be understood that the first and second locations can be any locations and that not all of the passengers need to exit the vehicle at once. For example, the vehicle 10 may be used to take a first passenger to the second location and a second passenger to a third location, etc. The number of potential destination locations is not limited by this disclosure.

Figure 2:
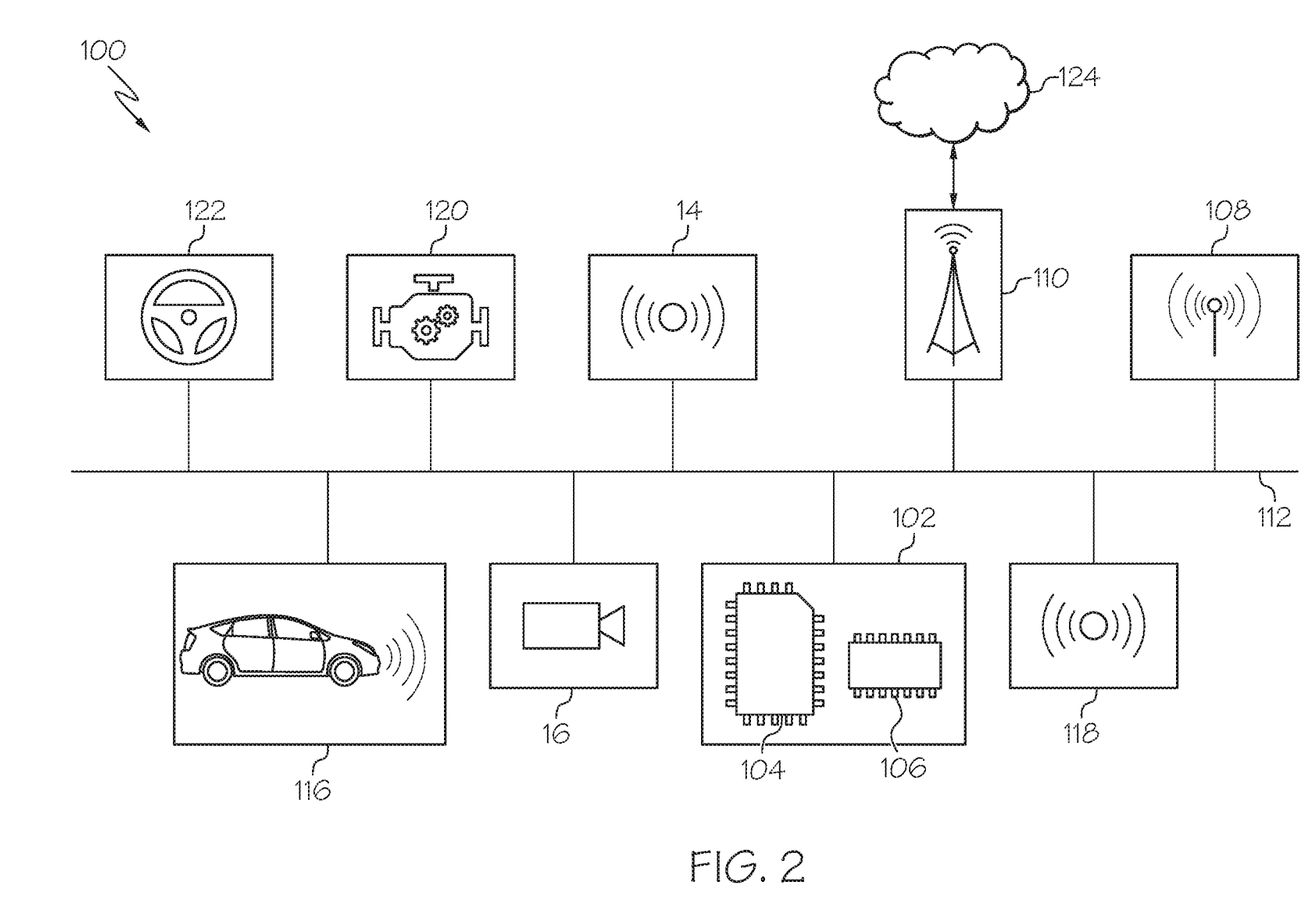
FIG. 2 schematically depicts an illustrative embodiment of a system for operating a vehicle based on an occupancy status of the vehicle according to one or more embodiments shown and described herein.

Referring now to FIG. 2, an example embodiment of a system 100 for recording a route from a first location to a second location and returning to the first location from the second location based on an occupancy status (e.g., if there are no occupants in the vehicle) of the vehicle 10 of FIG. 1 is shown. The system 100 includes an electrical control unit (ECU) 102 including a processor 104 and a memory module 106. The system 100 also includes a location-determining sensor 108. In some embodiments, the system 100 includes the occupant detection sensor 14 and the camera 16. Additionally, the system 100 may include network interface hardware 110. The various system components may be communicatively coupled via a bus 112. Additionally, in some embodiments, the system 100 includes one or more external sensors 116 (e.g., camera, lidar, radar, sonar, etc.). The system 100 also includes one or more reflexive sensors 118 for determining a status of the vehicle 10 itself. The system 100 further includes a drive control unit 120 and a steering control unit 122.

The occupant detection sensor 14 may be, for example, a weight sensor, a thermal sensor, visual sensors such as visual or infrared sensors for detecting the presence of an occupant, audio sensors for detecting sound that may indicate the presence of an occupant, or any other type of sensor for automatically determining the presence of an occupant. For example, the system 100 may use an input from a microphone or other audio system configured to detect sound to determine an occupancy status of the vehicle.

The camera 16 may be, for example, a camera capable of detecting visible or infrared radiation. The camera 16 is communicatively coupled to the processor 104 via the bus 112. It is to be understood that the system 100 may include one or more cameras 16 and that, while FIG. 1 shows only a single camera 16 that is attached to a rear view mirror, one or more cameras could be located at various positions within or on the outside of the vehicle 10 without limitation. The FOV 15 of the camera 16 is arranged such that the camera 16 may obtain images inside the vehicle 10 and outside the vehicle 10. Referring again to FIG. 2, each camera 16 may be any device having an array of sensing devices capable of detecting radiation in an ultraviolet wavelength band, a visible light wavelength band, or an infrared wavelength band. Each camera 16 may have any resolution. The camera 16 may include an omni-directional camera, or a panoramic camera. In some embodiments, one or more optical components, such as a mirror, fish-eye lens, or any other type of lens may be optically coupled to the camera 16. The camera 16 may be located inside the vehicle 10 to capture image data of the occupants in the vehicle 10 and their gestures, expressions, etc. In some embodiments, the image data may be used to make one or more changes to vehicle settings, for example to change a destination of the vehicle 10. For example, passengers of the vehicle 10 may confirm one or more changes to vehicle settings by nodding, pointing, gesturing, etc. and such movements or gestures may be captured by the camera 16 and processed according to image or pattern recognition algorithms to affect the one or more changes. The camera 16 may capture image data outside the vehicle 10 based on the external objects or surroundings of the vehicle 10. For example, the camera 16 may capture one or more images of other vehicles in a parking lot in order to determine an open parking spot location in order to park.

In operation, the camera 16 captures image data and communicates the image data to one or more components communicatively coupled to the bus 112. For example, the image data may be received by the processor 104, which may process the image data using one or more image processing algorithms. Any known or yet-to-be developed video and image processing algorithms may be applied to the image data in order to identify an item, situation, or person. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms. In some embodiments, the processor 104 may be configured to use visual data captured by the camera 16 to recognize gestures, features, or other aspects of user (e.g., passengers) behavior and may use such recognition as an input signal. One or more vehicle settings may be updated based on such a visual signal.

Some embodiments may be configured to determine an identity of the occupants of the vehicle and may base various facets of system functionality on determined identities. For example, in some embodiments, at least some portion of a vantage of the camera 16 may include an interior of the vehicle 10 and the camera 16 may generate image data including images of the occupants of the vehicle 10. This image data may be processed to determine an identity of the occupant and only gestures performed by recognized or identified users may be recognized or used by the system 100 to initiate or accept changes to vehicle status. For example, a vehicle 10 may be configured to recognize an adult passenger and a child passenger (e.g., a parent/child who are using the vehicle 10 to get from one location to another) but the system 100 may be configured to take directions from the adult passenger only. In embodiments, camera-captured biometrics (facial recognition technology, fingerprint scanning, eye scanning, etc.) may be utilized to identify and/or authenticate the identity of an occupant of the vehicle. For example, images of the user may be captured by the camera 16 and stored (e.g., in the memory module 106) and the stored images may be compared to subsequent images to identify the user. In some embodiments, an image on a photo identification card, such as a driver's license or a state-issued identification card may be used as an initial image to identify a user and/or other passengers of the vehicle 10. Such embodiments may be used in the case of a subscription service to access the services of the vehicle 10, for example. Identification of the passengers may be required, for example, to generate an account and to allow access to the vehicle 10.

The external sensors 116 may include one or more of camera, lidar, radar, and sonar sensors. In some embodiments, the one or more external vehicle environment sensors may include the lidar sensor. The lidar sensor is communicatively coupled to the processor 104 via the bus 112. The lidar sensor, or light detection and ranging sensor, uses pulsed laser light to measure distances from the lidar sensor to objects that reflect the pulsed laser light. The lidar sensor may be made of solid-state devices with few or no moving parts, including those configured as optical phased array devices where its prism-like operation permits a wide field-of-view without the weight and size complexities associated with a traditional rotating lidar system. The lidar sensor is particularly suited to measuring time-of-flight, which in turn can be correlated to distance measurements with objects that are within a field-of-view of the lidar sensor. By calculating the difference in return time of the various wavelengths of the pulsed laser light emitted by the lidar sensor a digital 3-D representation of a target or environment may be generated. The pulsed laser light emitted by the lidar sensor may, in one form, be operated in or near the infrared range of the electromagnetic spectrum, with one example having emitted radiation of about 905 nanometers. Sensors such as the lidar sensor can be used by vehicle 10 to provide detailed 3-D spatial information for the identification of objects near the vehicle 10, as well as the use of such information in the service of systems for vehicular mapping, navigation and autonomous operations, especially when used in conjunction with geo-referencing devices such as the location determining sensor 108 or a gyroscope-based inertial navigation unit (INU, not shown) or related dead-reckoning system.

In some embodiments, data collected using the lidar sensor may be compared and/or combined with image data from a camera (e.g., a camera of the external sensors 116 or the camera 16) to generate or refine a simulated model of the vehicle environment. In embodiments, the simulated model may be independently generated from the image data. Additionally, other sensor systems and mapping systems such as radar, inertial measurement units (IMU) and the like may be implemented to provide additional data to the processor 104 for processing image data to determine objects and sources of light in the environment of the vehicle 10.

In embodiments where the external sensors 116 include a sonar sensor, the sonar sensor may be communicatively coupled to the processor 104 via the bus 112. The sonar sensor may use sound wave propagation to communicate with or detect objects in the surrounding environment of the vehicle 10. The sonar sensor may emit a sound wave at any wavelength (e.g., infrasonic to ultrasonic sound) using a transponder which may be reflected back from objects in the environment. Data collected using the sonar sensor may be compared and/or combined with the image data from the camera to generate or refine a simulated model of the vehicle environment.

In embodiments where the external sensors 116 include a radar sensor, the radar sensor may be communicatively coupled to the processor 104 via the bus 112. The radar sensor may use electromagnetic wave (e.g., radio wave) propagation to communicate with or detect objects in the surrounding environment of the vehicle 10. The radar sensor may emit an electromagnetic wave at any wavelength (e.g., 30 Hz to 300 GHz) using a transponder which may be reflected back from objects in the environment. Data collected using the radar sensor may be compared and/or combined with the image data from the camera to generate or refine a simulated model of the vehicle environment.

The reflexive sensors 118 include sensors that are able to determine a status of the vehicle as it travels from one location to another along its commute. For example, the reflexive sensors 118 may measure the speed and/or acceleration of the vehicle on the road (e.g., directly using a GPS sensor or other position detection sensor or by measuring, for example, the magnitude of throttle and/or brake applied by an operator of the vehicle). The reflexive sensors 118 may measure maximum and minimum speeds at various locations along a commute. The reflexive sensors 118 may include gyroscopes, accelerometers, and the like. In some embodiments, the reflexive sensors 118 may measure the force of acceleration during a turn, for example, or may measure the degree of rotation of a steering wheel and the speed of the vehicle to determine how fast an operator drives the vehicle around a turn. The reflexive sensors may be coupled to the processor 104 through the bus 112.

The location-determining sensor 108 may be coupled to the bus 112 such that the bus 112 communicatively couples the location-determining sensor 108 to other modules of the system 100. The location-determining sensor 108 is configured to receive signals from global positioning system satellites or other position locating devices (e.g., cell network towers, GPS transponders, etc.). Specifically, in one embodiment, the location-determining sensor 108 includes one or more conductive elements that interact with electromagnetic signals transmitted by global positioning system satellites. The received signal is transformed into a data signal indicative of the location (e.g., latitude and longitude) of the location-determining sensor 108 or an object positioned near the location-determining sensor 108, by the processor 104. In embodiments where the system 100 is coupled to a vehicle, the processor 104 may execute machine-readable instructions to transform the global positioning satellite signals or other signals received by the location-determining sensor 108 into data indicative of the current location of the vehicle 10. While the system 100 includes the location determining sensor 108 in the embodiment depicted in FIG. 2, the system 100 may not include the location determining sensor 108 in other embodiments, such as embodiments in which the system 100 does not utilize global positioning satellite information or embodiments in which the system 100 obtains global positioning satellite information from a mobile device or other external device or network.

The network interface hardware 110 is coupled to the processor 104 via the bus 112. The network interface hardware 110 may be any device capable of transmitting and/or receiving data via a network, such as the external network 124. Accordingly, network interface hardware 110 can include a communication transceiver for sending and/or receiving any wired or wireless communication. For example, the network interface hardware 110 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 110 includes hardware configured to operate in accordance with the Bluetooth wireless communication protocol. In another embodiment, the network interface hardware 110 may include a Bluetooth send/receive module for sending and receiving Bluetooth communications to/from a network. The network interface hardware 110 may also include a radio frequency identification ("RFID") reader configured to interrogate and read RFID tags. In some embodiments, the network interface hardware 110 may be used to create a vehicle-to-vehicle (V2V) or a vehicle-to-infrastructure (V2I) connection with one or more other vehicles in the surrounding environment (e.g., one or more other autonomous vehicles).

The drive control unit 120 may control the propulsion and/or braking of the vehicle 10 and the steering control unit 122 may control the steering and/or other maneuvering of the vehicle 10. The drive control unit 120 may be communicatively coupled to the processors 104 via the bus 112. The drive control unit 120 may effect one or more changes to the engine, brakes, or other systems that affect the propulsion of the vehicle (e.g., transmission system, fuel-economy systems, battery systems, etc.). The steering control unit 122 may effect one or more changes to the steering of the vehicle 10. The drive control unit 120 and/or the steering control unit 122 may include system inputs and outputs that cause the vehicle to move autonomously from one location to another. In embodiments, the drive control unit 120 and/or the steering control unit 122 include one or more sensors for sensing an input from a user when the vehicle 10 is operating in a manual-control (i.e., non-autonomous or partially autonomous mode) that may be used to recreate the manually-controlled steps autonomously when the vehicle is operating in a partially autonomous or fully autonomous mode.

Figure 3:
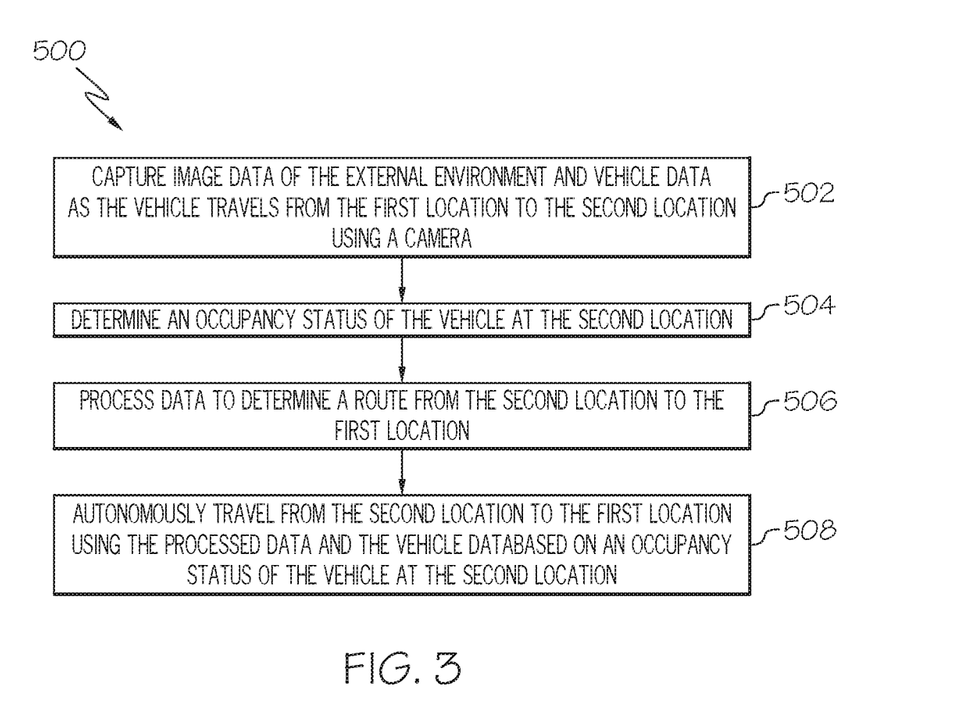
FIG. 3 schematically depicts a method of autonomously moving a vehicle from a second location to a first location, according to one or more embodiments shown and described herein.

Referring now to FIG. 3, a method 500 for autonomously moving a vehicle from a second location to a first location is depicted in multiple steps. The method may be carried out, for example, using a vehicle such as the vehicle 10 of FIG. 1 including a processor 104 and memory module 106 such as that shown in FIG. 2. One or more of the steps of method 500 may be carried out as program instructions executed by the processor 104.

At step 502, the system 100 may capture image data of the external environment and vehicle data as the vehicle 10 travels from the first location to the second location using a camera (e.g., a camera of the external sensors 116 and/or the camera 106). In some embodiments, the vehicle 10 uses multiple cameras. The visual data is captured, recorded, and later used to identify a location of the vehicle 10 as it drives from the second location to the first location autonomously. The visual data may be processed using any known or to-be-developed image-processing algorithm. For example, the image data may be segmented and classified into various objects. The classification of an object may include partitioning of image data into one or more segments based on a classification of the individual pixels in the image data. One or more image segmentation algorithms may be stored in an on-board (e.g., the memory module 106) or external memory (e.g., an external network) and accessed via the network interface hardware 110 and applied to the image data generated by the camera 16. Example segmentation algorithms include, but are not limited to, thresholding algorithms, clustering algorithms, edge-detection algorithms, region-growing algorithms, and dual clustering algorithms. The processor 104 may extract edge segments using an edge segment extraction algorithm, for example, using Gaussian derivatives and may store extracted points in a lookup table, for example, In embodiments, the system 100 may store image data locally (e.g., in the one or more memory modules 106) or externally (e.g., in an external network). Image data may be stored with respect to one or more of a particular location, segment of the route, or route. In some embodiments, the system 100 may request to share data captured by a particular vehicle with other vehicles and systems that may be communicatively coupled with the vehicle 10 (e.g., via an external network). For example, the system 100 may request to share content captured by the system (e.g., image data, position data, reflexive sensor data, etc.). The content may be shared, for example, by uploading the content to a library of content on an external network that may be accessed by one or more other users or other vehicles. Data from different users and other vehicles may be shared, compared, analyzed, and redistributed to make the system 100 more robust. That is, a vehicle may upload its captured content to an external network and other vehicles may download the content. In some embodiments, the uploaded and downloaded content may include traffic information. For example, traffic information (e.g., real-time images of traffic and other traffic data reflecting the current and/or historical status of traffic along a route, segment of the route, or at a location) may be stored locally (e.g., in the memory module 106) or accessed remotely (e.g., via a connection with an external network).

The vehicle data may be captured by the reflexive sensors 118 and may include information such as steering angle, speed of the vehicle, acceleration of the vehicle, throttle position, and brake status. Accordingly, the reflexive sensors 118 include sensors for detecting the status of each of these and are connected with the processor 104 via the bus 112. In some embodiments, the data captured by the reflexive sensors 118 may be used to control the driving characteristics of the vehicle 10 as it travels back from the second location to the first location. For example, if the vehicle 10 travelled at a first speed on the trip from the first location to the second location, it may travel at the first speed on the return trip from the second location to the first location.

At step 504, the system 100 may determine an occupancy status of the vehicle 10 at the second location (e.g., the system 100 may determine that there are one or more occupants in the vehicle 10). The vehicle 10 may use, for example, the occupant detection sensor 14 and/or the camera 16. For example, the system 100 may determine that a passenger is in the vehicle 10 by capturing an image of the interior of the vehicle 10 with the camera 16 and analyzing the image to determine the occupant status. In some embodiments, the occupant detection sensor 14 is a thermal imaging sensor that detects the body heat of one or more occupants. In other embodiments, the occupant detection sensor 14 is a weight sensor that is triggered based passenger weight. The occupant detection sensor 14 may be configured to detect both an occupant and his or her location within the vehicle 10. For example, in some embodiments, the system 100 may be configured to determine that there is no passenger in the driver's seat of the vehicle 10 and may be configured to operate in an autonomous mode based on there being no person to drive the vehicle 10 in the driver's seat or to decline to operate until there is an occupant in the driver's seat of the vehicle 10. In some embodiments, the vehicle 10 may be configured to recognize particular passengers within the vehicle 10. Such detection may be useful for restrictions on movement of the vehicle 10 based on limitations of the particular passengers. For example, if a child (i.e., under the legal driving age) is alone in the vehicle 10, the vehicle 10 may be restricted to operating in areas where the vehicle 10 already has sufficient information about the operating area to operate autonomously because the child is ostensibly not licensed to or capable of operating the vehicle 10. In some embodiments, a particular passenger identification may be made and associated with an account associated with details such as identification and/or registration witnessing the proof of license to operate a motor vehicle and insurance to operate such a vehicle.

In some embodiment, the second location is a destination input by an occupant of the vehicle 10. In response to determining that the vehicle 10 arrived at the second location, the system 100 may determine an occupancy status of the vehicle 10 at the second location.

At step 506, the system 100 may process data received from one or more of its sensors to determine a route from the second location to the first location. In some embodiments, processing the data may include comparing processed image data captured on the route from the first location to the second location to data that is captured as the vehicle starts to drive back to the first location from the second location. That is, the vehicle may capture image data as it drives from the second location to the first location and compare it to the image data captured on the trip to the second location from the first location and compare the segmented and classified portions of the image data. For example, the vehicle 10 may detect a fire hydrant on the way from the first location to the second location just before reaching the second location. The vehicle 10 would then determine whether it could see such fire hydrant on its return trip from the second location to the first location. In some embodiments, the system 100 may process and compare data received from the external sensors 116 in order to travel from the second location to the first location.

In some embodiments, the vehicle 10 may recognize one or more objects in the environment using data captured by the externally facing sensors (e.g., the camera, the lidar, the sonar, the radar, etc.) and may use visual navigation techniques based on the location of these objects. For example, the vehicle 10 may detect two (or more) objects and may use stereo navigation based on the location of the two objects. The two (or more) objects may have been detected and classified as stationary objects (e.g., road signs, landmarks, etc.) on the leg from the first location to the second location. The vehicle 10 may calculate a distance to the two (or more) objects to determine its location as it drives from the second location back to the first location. In some embodiments, the image data may be processed to determine the most suitable features of image data or other sensor data for location detection. Offsets may be applied when processing the image data to account for differences in lane location (e.g., the vehicle 10 may drive in the opposite lane of a two-lane road on the way back from the second location). In embodiments, the image data captured during the return leg may be mapped onto the image data of the first leg for comparison and navigation. In some embodiments, the vehicle may travel from the second location to the first location based on location information obtained from the location sensors and the sequence of location information recorded during the trip from the first location to the second location.

At step 508, the system 100 may cause the vehicle 10 to autonomously travel from the second location to the first location using the processed image data and the vehicle data based on the occupancy status of the vehicle 10 (e.g., if there are no occupants in the vehicle 10) at the second location. That is, if the system 100 determines that there are no occupants in the vehicle 10, it may begin the return trip from the second location to the first location. During the return trip, the movement of the vehicle 10 may be controlled by the drive control unit 120 and the steering control unit 122 of FIG. 2, for example. The occupancy status may be determined, for example, by the occupant detection sensor 14 and/or by the camera 16. In some embodiments, a user may have the option of delaying a return of the vehicle 10, for example, when making short stops (e.g., for groceries, etc.). For example, a user may use a push button display or other type of display within the vehicle 10 to cause the vehicle to wait a period of time before determining whether to travel back to the first location. In some embodiments, such functionality may be capable through an application on a personal electronic device of the user. For example, the user may use an app to cause the vehicle to delay a journey back to the first location despite no vehicle occupancy detected by the occupant detection sensors 14. For example, a user may park the vehicle at an intermediate location (e.g., to run an errand, at a grocery store, a convenience store, etc.) and may access an app on his or her electronic device that connects with the vehicle 10 (e.g., through an external network such as a cellular network and the network interface hardware 110) and causes the vehicle 10 to delay returning to the first location notwithstanding the fact that the vehicle 10 is unoccupied as determined by the occupant detection sensors 14.

If the vehicle 10 determines that it is unoccupied and returns to the first location, it may follow the route generated at step 506. One or more autonomous driving instructions may be stored on-board the vehicle 10 (e.g., in the memory module 106) and the input of the reflexive sensors 118 may be used to determine the vehicle characteristics as the vehicle 10 travels. The vehicle 10 may be controlled using the drive control unit 120 and the steering control unit 122, which may receive the one or more autonomous driving instructions via the bus 112 or via some other communicative connection with the processor 104. In some embodiments, the vehicle may autonomously travel to a third location (e.g., if demand for the vehicle is high at the third location after determining the vehicle is unoccupied).

Figure 4:
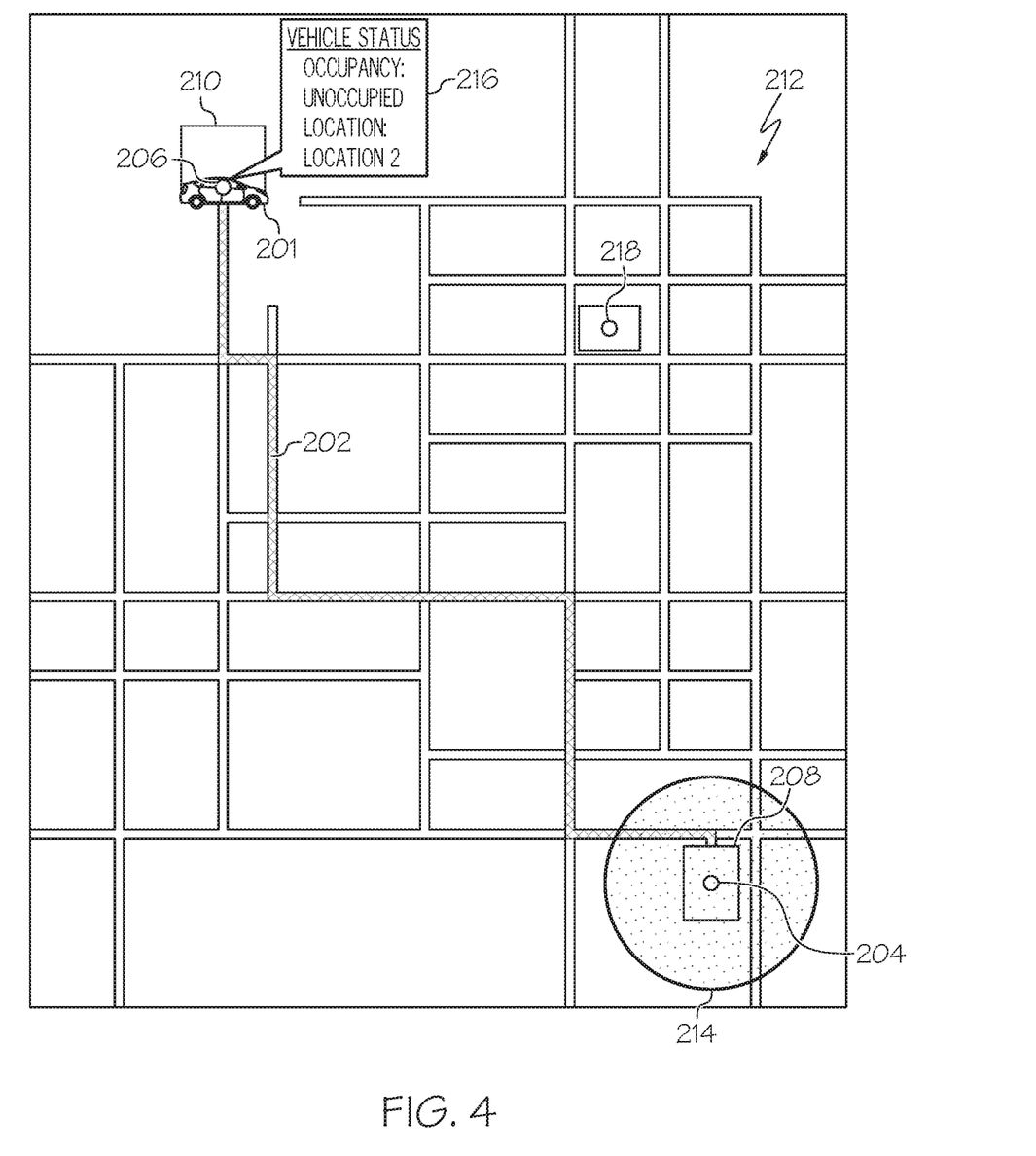
FIG. 4 schematically depicts an illustrative embodiment of a route for autonomously returning a vehicle from a second location to a first location according to one or more embodiments shown and described herein.

Referring now to FIG. 4, an exemplary scenario for using an embodiment of the system 100 of FIG. 2 is depicted. FIG. 4 shows a map 212 that depicts a recorded route 202 that is recorded by a vehicle 201 as the vehicle 201 moves from a first location 204 to a second location 206. In the particular example, the first location 204 is in a first parking lot 208 and the second location 206 is in a second parking lot 210. The map 212 could be displayed, for example, on a display within the vehicle 10 of FIG. 1, but it is contemplated that the map 212 is not necessarily displayed. Surrounding the first location 204 is a first location area 214 that surrounds the first location 204 out to a particular first location radius.

The recorded route 202 may be recorded as the vehicle 201 is driven from the first location 204 to the second location 206. For example, the vehicle 201 may be configured to operate in a manual, semi-autonomous, or a fully-autonomous mode. A driver may drive the vehicle 201 to the second location 206 from the first location 204 or a passenger may order the vehicle to proceed from the first location 204 to the second location 206 semi-autonomously or fully-autonomously and the vehicle 201 may record the route that it follows along the way from the first location 204 to the second location 206. While the vehicle 201 may be configured with navigation software for developing a route from the first location 204 to the second location 206 before it leaves the first location 204, such route may later be determined to be blocked, may have heavy traffic or construction work, or may otherwise be undriveable by the vehicle 201. Accordingly, the vehicle 201 is configured to record the recorded route 202 as the vehicle 201 travels. The recorded route 202 may be recorded, for example, using the processor 104, the memory module 106, and one or more signals generated by the location-determining sensor 108.

Additionally, the vehicle 201 is configured to capture data using one or more sensors as it travels the recorded route 202. For example, the vehicle 201 captures image data using the camera 16 as it drives from the first location 204 to the second location 206. Additionally, the vehicle 201 may record other data using the external sensors 116, the location-determining sensor 108, and/or the reflexive sensors 118. For example, the vehicle 201 may capture lidar data, sonar data, or radar data as it travels from the first location 204 to the second location 206. The vehicle 201 may store image data locally and/or may upload the image data to an external network. In some embodiments, the captured data may be shared with other vehicles in a vehicle network with the vehicle 201. Conversely, the vehicle 201 may receive data shared by other vehicles in the network.

The second location 206 may be a destination of one or more passengers of the vehicle 201. The passenger may input the second location 206 before he or she enters the vehicle 201 at the first location 204 (e.g., using a personal electronic device) and/or after he or she enters the vehicle 201 (e.g., using a display of the vehicle 201). The vehicle 201 may be used to transport the passenger from the first location 204 to the second location 206. In some embodiments, the passenger drives the vehicle 201 the entire way. In some embodiments, the passenger may drive the vehicle 201 part of the way and the other part the vehicle 201 may operate semi-autonomously. For example, if the vehicle 201 has access to sufficient data to operate over a given portion of the recorded route 202 from the first location 204 to the second location 206, the vehicle 201 may operate in a semi-autonomous or autonomous mode for that portion of the recorded route 202. At other portions of the route where the vehicle 201 has access to insufficient data to operate autonomously or semi-autonomously, the vehicle 201 may require the passenger to drive.

Once the vehicle 201 arrives at the second location 206, the passenger may exit the vehicle 201 and the vehicle 201 may be empty. Accordingly, one or more of the occupant detection sensors 14 and/or the camera 16 may be configured to detect the occupancy status of the vehicle 201. One or more of the occupant detection sensors 14 and the camera 16 may generate an occupancy signal based on the detected occupancy status. The occupancy signal may be sent to one or more other components, for example, via the bus 112. The processor 104 may process the occupancy signal based on one or more instructions stored in the memory module 106.

Based on the occupancy status detected by the occupant detection sensors 14 and/or the camera 16 (e.g., if there are no occupants in the vehicle 10), the vehicle 201 may autonomously return to the first location from the second location 206. For example, the processor 104 may process the occupancy signal to determine the vehicle is unoccupied and may cause the vehicle to follow the recorded route from the second location 206 to the first location 204. In embodiments, the vehicle may return to the exact location it was in at the first location 204. For example, in some embodiments, the first location 204 may be a controlled area where only vehicles in a particular vehicle network, with a particular configuration, or with particular permissions may park. For example, the vehicle 201 may be configured with an RFID reader or other identifying feature that particularly identifies the vehicle 201 and is used to grant access to a parking area. In some embodiments, the identifying feature may unlock the parking area.

However, in some embodiments, the vehicle 201 may not return to the exact location of the first location 204. For example, one or more conditions may have changed at the first location 204 such that it is impossible for the vehicle 201 to return to the exact location or it may be beneficial for the vehicle 201 to return to a location that is different from the first location 204. For example, if the first location 204 is a specific parking spot, another vehicle may have parked in the specific parking spot, leaving no room for the vehicle 201 at the first location 204. Accordingly, in some embodiments, the vehicle 201 may not return precisely to the exact position and orientation it was in at the first location 204. Instead, the vehicle 201 may return to within the first location area 214. The first location area 214 may be an area that surrounds the first location 204 by one or more dimensions (e.g., a radius, a length by a width, etc.). The vehicle 201 may be configured to find a suitable parking place in the first location area 214. For example, the vehicle 201 may use one or more of the external sensors 116 (e.g., the lidar, sonar, radar, externally facing camera, etc.) to determine a suitable parking location. In some embodiments, the vehicle 201 may be configured to return to the first location area 214 without regard for whether the vehicle 201 can park in the first location 204 or not.

Once the vehicle 201 has returned to the first location 204, it may be reconfigured to receive another passenger or passengers in order to take the second passenger or group of passengers to a different location. Accordingly, the vehicle 201 may update its status within a network of similarly configured vehicles to represent to one or more potential passengers that it is at the first location 204 and/or within the first location area 214 and configured to receive one or more additional passengers. Accordingly, one or more additional passengers may enter the vehicle 201 and use it to travel to a different location as described herein.

In some embodiments, the vehicle 201 may be configured to expand one or more dimensions of the first location area 214 if it is unable to find a suitable place to park in the first location area 214. That is, in the particular exemplary embodiment depicted in FIG. 4, the radius of the first location area 214 may expand outward if the vehicle 201 is unable to locate a suitable parking spot in the first location area 214. The vehicle 201 may use one or more of the external sensors 116 to determine a suitable parking location. For example, the vehicle 201 may use one or more of lidar sensors, sonar sensors, radar sensors, or an externally facing camera to determine a parking location that is suitable in size for the vehicle 201 and that complies with local parking regulations. In some embodiments, the vehicle 201 may communicatively couple with one or more external networks using the network interface hardware 110 to determine local parking regulations.

In embodiments in which the vehicle 201 is an electric vehicle, the vehicle 201 may be configured to route directions and to autonomously travel (e.g., using the drive control unit 120 and the steering control unit 122) to a charging station 218 in order to recharge its batteries. The vehicle 201 may be configured to route to the charging station 218 to recharge its batteries based on measurements of one or more of a current charge status (i.e., the amount of electrical energy stored in the vehicle battery) and the use rate of the energy stored in the battery, as well as numbers derived from these two measured characteristics (e.g., averages, etc.). For example, the processor 104 may execute one or more of the processor-readable instructions stored in the memory module 106 to calculate an average use rate of the battery over a given time (e.g., a day, a week, a year, etc.) and the average use rate may be used to determine when the battery is expected to drop below a threshold level. The vehicle 201 may determine to travel to the charging station 218 based on the expected drop below the threshold level. In some embodiments, the vehicle 201 may determine to visit the charging station 218 after a given trip based on the given trip distance and the expected battery use on the trip.

Still referring to FIG. 4, some embodiments of the system may cause a status of one or more vehicles like the vehicle 201 to be displayed such that the vehicles in a vehicle network can be tracked. The status may show, for example, an occupancy status of the vehicle 201 and the location of the vehicle 201 as shown in a status box 216.

Still referring to FIG. 4, in some embodiments, if the vehicle 201 becomes unable to continue operating autonomously as it returns from the second location 206 to the first location 204, the vehicle 201 may use one or more of the external sensors to find a desirable place to wait until such time as it has sufficient data to return to the first location 204 or it is retrieved manually. For example, a retrieval service may retrieve the vehicle 201 if it is unable to travel all the way from the second location 206 back to the first location 204. In some embodiments, the vehicle 201 may generate a signal (e.g., using the network interface hardware 110) indicating that it needs to be retrieved that travels over an external network to a retriever. In some embodiments, the signal may include a location of the vehicle 201 as determined by the location-determining sensor 108 of FIG. 2.

Figure 5:
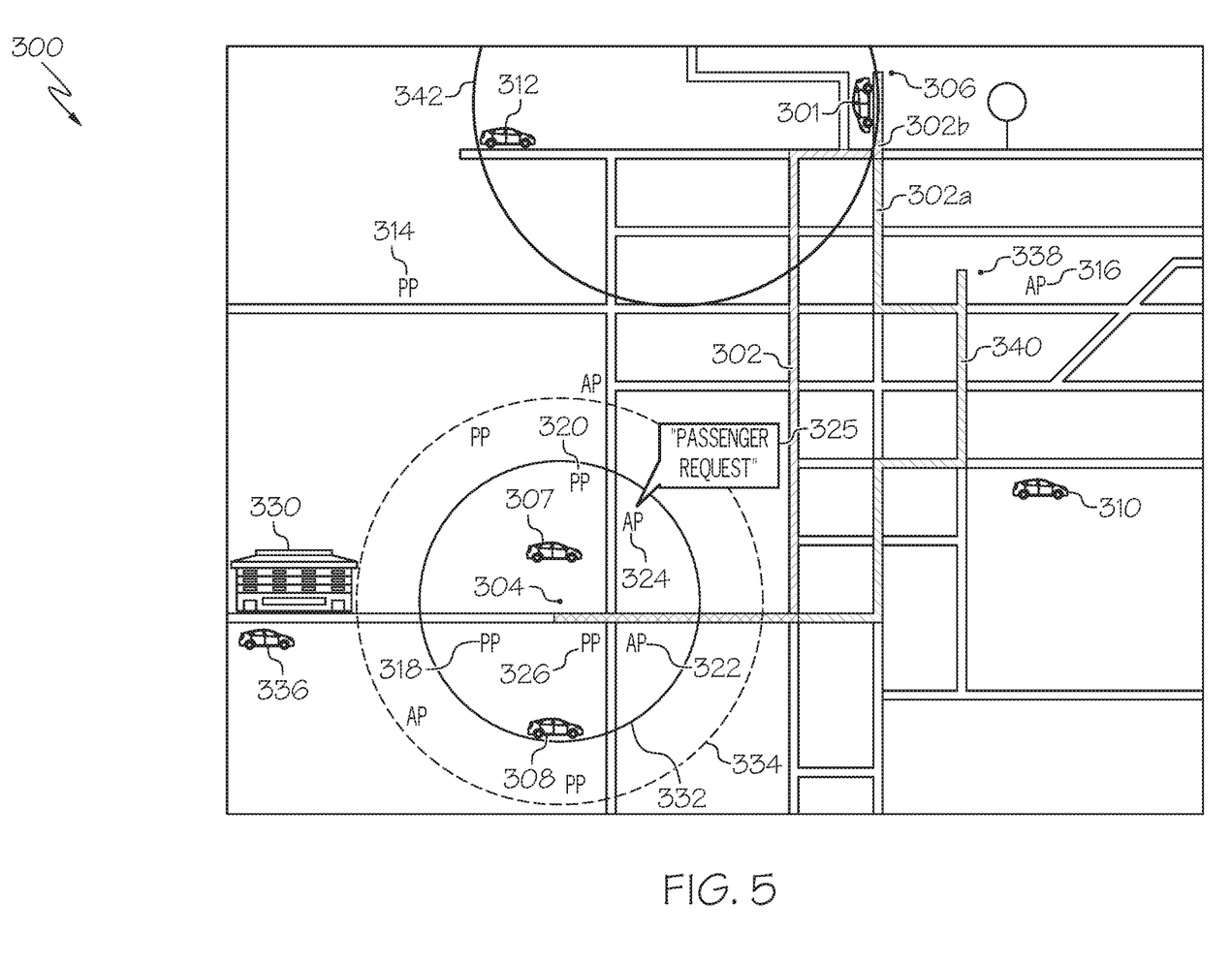
FIG. 5 schematically depicts an illustrative embodiment of a first location area for operating an autonomous vehicle according to one or more embodiment shown and described herein.

Referring now to FIG. 5, an exemplary scenario 300 for utilizing the system 100 of FIG. 2 is depicted. The exemplary scenario depicts a recorded route 302 from a first location 304 to a second location 306. A vehicle 301 travels the recorded route 302 and records the recorded route 302 as it travels from the first location 304 to the second location 306. The vehicle 301 may be driven by a passenger, such as the passengers 12 of FIG. 1, or may travel autonomously or semi-autonomously with one or more passengers in the vehicle 301. FIG. 5 also depicts a secondary recorded route 302a from the second location 306 to a third location 338 and a generated route 340 from the third location 338 to the first location 304. Also depicted in FIG. 5 is an area of interest 330 (depicted as a stadium), multiple other additional vehicles 307, 308, 310, 312, multiple passive passengers 314, 318, 320, 326, and multiple active passengers 316, 322, 324. An indicator indicates an active passenger request 325 for a vehicle to drive an active passenger to a different location. A first location primary radius surrounds a first location area 332 surrounds the first location 304 and a first location area 334 indicates a hypothetical change in size of the first location area 332. The system 100 may determine the size of the first location area 332 based on one or more factors. For example, a number of other autonomous vehicles (e.g., vehicles 307, 308) within a particular radius of the first location area 332, a number of potential passengers (e.g., passive passengers 314, 318, etc. and/or active passengers 316, 322, etc.) within a particular radius of the first location area 332. That is, the first location area 334 may increase or decrease in size based on optimizing the probability that the vehicle 301 will be utilized to carry a passenger from one location to another. In some embodiments, the first location radius of the first location area 332 may be expanded to increase the size of the first location area 332 (e.g., as shown by the exemplary larger first location area 334). The first location radius may be expanded based on one or more of a number of passive passengers within the first location area 332, a number of active passengers within the first location area 332, and a number of autonomous vehicles within the first location area 332, for example.

Still referring to FIG. 5, in some embodiments, the vehicle 301 travels from the first location 304 to the second location 306 carrying one or more occupants as it travels. The vehicle 301 may be configured to detect the various occupants as described herein. As the vehicle drives, it may record the recorded route 302 that it travels. The vehicle 301 may determine the second location 306 based on, for example, a connection with a portable electronic device of one or more of the passengers, and the second location 306 may be input into the system 100, for example, by a passenger, or via some other means. In some embodiments, the vehicle 301 may be driven to the second location 306 from the first location 304 by one or more of the passengers. Once the vehicle 301 arrives at the second location 306, the vehicle drops off the one or more passengers. One or more of the passengers may exit the vehicle 301 and the vehicle 301 may proceed to the first location 304 based on the occupancy status of the vehicle 301 along the recorded route 302.

In embodiments of the vehicle 301 configured to carry two or more passengers, two or more passengers may enter the vehicle 301 and may desire to proceed to different ultimate destinations. Accordingly, referring to the particular exemplary scenario depicted in FIG. 5, one or more of the passengers may not exit the vehicle 301 when the vehicle 301 arrives at the second location 306. For example, one or more passengers may proceed in the vehicle 301 to the third location 338. The passengers may drive the vehicle 301 to the third location 338 and/or proceed to the third location 338 in an autonomous or semi-autonomous driving mode as described herein. As the vehicle proceeds to the third location 338, the vehicle 301 may record the secondary recorded route 302a from the second location 306 to the third location 338 as a secondary recorded route.

The vehicle 301 may be configured to return to the first location 304 based on multiple different routes. For example, in the scenario in which the vehicle 301 drops off multiple passengers at separate locations, the vehicle may generate an altered recorded route which may subtract overlapping portions of the recorded route and the secondary recorded route such that the vehicle 301 does not unnecessarily travel from the third location 338 to the second location 306 as it travels from the third location 338 to the first location 304. Instead, the alternate recorded route may follow portions of the secondary recorded route 302a that do not overlap with portions of the recorded route 302 when returning to the first location 304 using the secondary recorded route 302a and the recorded route 302. For example, the indicated portion 302b may be subtracted from the vehicle's return trip from the third location 338 to the first location 304 if the vehicle returns to the first location 304 from the third location 338 using the secondary recorded route 302a and the recorded route 302. The vehicle 301 may recognize overlapping portions of the route by correlating image and other data captured by the external sensors 116 as it drives from the second location to the third location and recognizes previously-captured images and objects.

In some embodiments, after a subsequent passenger has left the vehicle 301 (e.g., at the third location 338), the vehicle 301 may generate a new route to the first location 304 from the third location 338. That is, the vehicle 301 may follow a generated route 340 from the third location 338 to the first location 304 if it has previously recorded sufficient data along the generated route 340 and/or has access to such data along the generated route 340 (e.g., if the other vehicles sharing data with the vehicle 301 have captured such data). The vehicle 301 may generate such a route using, for example, one or more of the processor 104 and processor-readable instructions stored in the memory module 106, and an input from the location-determining sensor 108. The generated route 340 may be generated based on one or more criteria. For example, the generated route 340 may be generated based on minimizing the travel time from the third location 338 to the first location 304, minimizing the distance the vehicle 301 will travel as it travels between the third location 338 and the first location 304, and other factors. To generate the generated route 340, the vehicle 301 may receive one or more inputs from external networks. For example, the vehicle 301 may receive data regarding traffic patterns that it may encounter as it travels from the third location 338 to the first location 304 in order to generate the most efficient route from the third location 338 to the first location 304 based on traffic. The vehicle 301 may receive data regarding road and/or weather conditions between the third location 338 and the first location 304 in order to generate the most efficient route from the third location 338 to the first location 304 based on road and/or weather conditions. Other factors that may affect one or more characteristics of the trip from the third location to the first location may be taken into account (e.g., the presence of charging stations or refueling stations along the route, the battery charge or fuel level of the vehicle 301, etc.).

As shown in FIG. 5, in some embodiments, the vehicle 301 may receive a passenger request 325 from one or more active passengers, such as the active passenger 324. The passenger request may be a request to reserve at least one seat in the vehicle 301 such that the passenger can use the vehicle 301 to travel from the first location 304 to the second location 306. In embodiments, after the vehicle 301 drops off the passenger at the second location 306, the vehicle 301 may return to the first location 304 based on receiving one or more active passenger requests from within the first location area 332. In some embodiments, the vehicle 301 may remain at the second location 306 in the absence of receiving one or more active passenger requests from within the first location area 332.

In some embodiments, the vehicle 301 may be configured to connect (i.e., communicatively couple to exchange information in-between nodes) to one or more external vehicles. For example, the vehicle 301 may be configured to connect to the vehicle 307 and the vehicle 308 within the first location area 332 or to other vehicles within a connection radius 342 of the vehicle 301. The connection radius 342 is illustrated as surrounding the vehicle 312 but it is to be understood that the size of the connection radius 342 may be changed such that all of the vehicles could be encircled within the connection radius 342 and the vehicle 301 could connect to each of them. Additionally, although it is not shown, each of the vehicles may be configured to exchange information within their own connection radius. Vehicles may send or exchange information with other vehicles within their connection radius and may detect, for example, the presence of one or more signals from a device or devices (e.g., personal electronic devices, etc.) indicating the presence of the device and/or a status of the device as indicating a passenger request or the possibility of a passenger request within their detection radius. The vehicles may send and/or exchange information such as, for example, the number of active passengers, and the number of passive passengers within a detection radius of the vehicle. Additionally, the vehicles may be configured to connect to one or more cellular networks or other wireless networks to transmit and receive such information over the wireless networks. The vehicles may connect to the external networks and other vehicles using, for example, the network interface hardware 110.

In embodiments, vehicles may detect the number of active passengers (indicated as AP in FIG. 5) and passive passengers (indicated as PP in FIG. 5) within a particular area (e.g., the first location area 332) and may be configured to take one or more actions based on the number of active passengers and/or passive passengers within the particular area. An active passenger may be, for example, a passenger that is actively seeking a ride in the vehicle 301. A passive passenger may be, for example, a person holding or otherwise associated with a personal electronic device for which a probability of becoming an active passenger may be calculable and may be calculated to be above a passenger threshold. That is, based on one or more of a location of a personal electronic device, an account history, and one or more other factors, it may be calculable whether a particular personal electronic device or account associated with a passenger may be used to access the services of a vehicle to transport a passenger associated with the electronic device from one place to another (e.g., the first location 304 to the second location 306). The system 100 may be configured to generate a prediction or a likelihood that may represent the chance that the person holding a particular known electronic device may become an active passenger and thus, the system may generate a prediction of the number of active passengers that may seek to ride in the vehicle 301. A passive passenger may be a passenger that is not yet an active passenger but with a likelihood of becoming an active passenger that is above the passenger threshold.

In embodiments, the vehicle may be configured to determine the number of active passengers and/or passive passengers within the first location area 332 and may base returning to the first location 304 on the number of active passengers and/or active passengers within the first location area 332. The vehicle may determine the number of active passengers and/or passive passengers within the first location area 332 so that it does not return to the first location 304 unnecessarily (e.g., if there are no passengers at the first location 304 it may not be efficient for the vehicle 301 to proceed to the first location 304). In some embodiments, the vehicle may be configured to determine the number of autonomous vehicles at the first location 304 or within the first location area 332 and to autonomously return to the first location 304 from the second location 306 or a subsequent location using a recorded route based on a number of autonomous vehicles at the first location. For example, if the vehicles 307, 308 are autonomous vehicles, the vehicle 301 may not return to the first location area 332 based on other autonomous vehicles being present within the first location area 332, instead opting to drive to a location where a ratio of active and/or passive passengers to autonomous vehicles is lower (e.g., in order to have a higher probability of utilization by a passenger). In some embodiments, the vehicle 301 may be configured to return to the first location 304 from the second location 306 or a subsequent location based on the number of active passengers at the first location 304 and/or within the first location area 332. For example, if there are two (2) active passengers within the first location area 332, the vehicle 301 may autonomously return to the first location area 332 using the recorded route and/or secondary recorded route based on the number of active passengers (e.g., active passengers 322, 324 shown in FIG. 5) at the first location 304 and/or within the first location area 332. In embodiments in which the vehicle 301 returns to the first location area 332 based on the number of active passengers within the first location area 332, the number of active passengers required to trigger the vehicle's return to the first location area 332 is not limited to any particular number. In some embodiments, the vehicle 301 may be configured to return to the first location 304 from the second location 306 or a subsequent location based on the number of passive passengers at the first location 304 and/or within the first location area 332. For example, if there are three (3) passive passengers within the first location area 332, the vehicle 301 may autonomously return to the first location area 332 using the recorded route and/or secondary recorded route based on the number of passive passengers (e.g., passive passengers 318, 320, 326 shown in FIG. 5) at the first location 304 and/or within the first location area 332. In embodiments in which the vehicle 301 returns to the first location area 332 based on the number of active passengers within the first location area 332, the number of passive passengers required to trigger the vehicle's return to the first location area 332 is not limited to any particular number. In embodiments, the vehicle 301 may be configured to return to the first location 304 and/or the first location area 332 based on a combination of the number of active and/or passive passengers.

In some embodiments, the vehicle 301 may use the network interface hardware 110 to form one or more V2V connections or V2I connections with one or more other vehicles in the surrounding environment or with infrastructure in the surrounding environment. The V2V or V2I connections may be used to determine the number of vehicles within the first location area 332. For example, if the vehicle 301 makes a V2V connection with the other vehicle 307 and/or the other vehicle 308, the vehicle 301 may determine that additional vehicles are available to drive passengers from the first location area 332 to a separate location. Accordingly, the vehicle 301 may determine to return to the first location area 332 or not based on the presence of the other vehicles as determined by the V2V connection. In embodiments, the vehicle 301 and the vehicle 307 may both establish V2I connections with infrastructure in the surrounding environment and the presence of the vehicle 307 at the first location area 332 may be used to determine whether the vehicle 301 should return to the first location area 332 or not. In some embodiments, the presence of one or more other vehicles (e.g., vehicles 307, 308) as determined by the V2V and V2I connections may be used to determine whether or not the vehicle 301 should return to the first location area 332 based on one or more of a number of passive passengers within the first location area, the number of active passengers within the first location area 332, and the number of autonomous vehicles within the first location area 332. In other embodiments, the vehicle 301 may use such information to determine whether to return to an auxiliary location based on one or more of the number of passengers within the first location area 332, the number of active passengers within the first location area 332, and the number of autonomous vehicles within the first location area 332.

In embodiments, the vehicle 301 may be configured to change the size of the first location area 332. For example, the vehicle 301 may be configured to increase or decrease a radius of the first location area 332 surrounding the first location 304. In the illustrated embodiment shown in FIG. 5, the first location area 332 is expanded to a first location area 334. Accordingly, the vehicle may be able to increase the number of active passengers or passive passengers within the area surrounding the first location 304. The vehicle may change the size of the area surrounding the first location based on, for example, the number of active passengers and/or passive passengers within the area surrounding the first location 304.

It should now be understood that a vehicle-borne system may be used to record visual data and other data about the surrounding environment as a vehicle travels from a first location to a second location. The recorded data may be processed and used to cause the vehicle to autonomously travel back from the second location to the first location. The autonomous trip from the second location to the first location may be based on an occupancy status of the vehicle. Such systems may be used to transport vehicles to areas where they are most likely to be utilized and thus are more likely to be valuable to users of the system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   an electronic control unit comprising:
      a processor; and
      one or more processor-readable instructions; and
   an occupant detection sensor configured to output a signal indicative of a presence of an occupant and a location of the occupant within the vehicle, wherein:
   when executed by the processor, the one or more processor-readable instructions cause the vehicle to:
      record a driven route as a user drives the vehicle from a first location to a second location on a first leg of a trip, determine a return route for a second leg of the trip based on the driven route of the first leg of the trip, determine a first location area that surrounds the first location at a first location radius, receive a request from within the first location area, determine a number of active passengers and a number of passive passengers within the first location area, wherein the active passengers are passengers that are actively seeking a ride in the vehicle and the passive passengers are passengers holding or otherwise associated with a personal electronic device for which a probability of becoming the active passengers is above a passenger threshold, autonomously return to the first location from the second location on the second leg of the trip based on the number of active passengers and the number of passive passengers within the first location area, and the determined return route in response to receiving the request from within the first location area and determining that, based on the signal received from the occupant detection sensor, the vehicle is unoccupied at the second location, and remain at the second location in absence of receiving the request from within the first location area.

2. The vehicle of claim 1, wherein the processor-readable instructions further cause the vehicle to:

autonomously return to the first location from the second location using the determined return route based on a number of autonomous vehicles at the first location.

3. The vehicle of claim 1, wherein the processor-readable instructions further cause the vehicle to:

autonomously return to the first location from the second location using the determined return route based on a passenger request at the first location.

4. The vehicle of claim 1, wherein the processor-readable instructions further cause the vehicle to:

record a secondary route from the second location to a third location, and autonomously return to the first location from the third location using one or more of the determined return route and the recorded secondary route in response to determining that, based on the signal received from the occupant detection sensor, the vehicle is unoccupied at the third location.

5. The vehicle of claim 1, wherein the processor-readable instructions further cause the vehicle to:

autonomously return to the first location from the second location using the determined return route based on a number of autonomous vehicles within the first location area.

6. The vehicle of claim 1, wherein the processor-readable instructions further cause the vehicle to:

autonomously return to the first location from the second location using the determined return route based on the number of active passengers within the first location area.

7. The vehicle of claim 1, wherein the processor-readable instructions further cause the vehicle to:

autonomously return to the first location from the second location using the determined return route based on the number of passive passengers within the first location area.

8. The vehicle of claim 1, wherein the processor-readable instructions further cause the vehicle to:

expand the first location radius based on one or more of:
(i) the number of passive passengers within the first location area;
(ii) the number of active passengers within the first location area; and
(iii) a number of autonomous vehicles within the first location area.

9. The vehicle of claim 8, wherein the number of autonomous vehicles within the first location area is determined based on one or more of:
(i) one or more vehicle-to-vehicle (V2V) connections with other autonomous vehicles; and
(ii) one or more vehicle-to-infrastructure (V2I) connections.

10. The vehicle of claim 9, wherein the one or more processor-readable instructions further cause the vehicle to autonomously travel from the first location to an auxiliary location based on one or more of:
(i) the number of passive passengers within the first location area;
(ii) the number of active passengers within the first location area; and
(iii) a number of autonomous vehicles within the first location area.

11. The vehicle of claim 1, wherein the processor-readable instructions further cause the vehicle to:

wait for a period of time before determining whether to return to the first location.

12. The vehicle of claim 1, wherein the processor-readable instructions further cause the vehicle to:

in response to receiving an input for delaying returning, delay returning to the first location from the second location for a period of time even in response to determining that the vehicle is unoccupied at the second location.

13. A system comprising:
an electronic control unit comprising:
a processor; and
one or more processor-readable instructions; and
an occupant detection sensor configured to output a signal indicative of a presence of an occupant and a location of the occupant within a vehicle, wherein:
when executed by the processor, the one or more processor-readable instructions cause the system to:
record a driven route as a user drives the vehicle from a first location to a second location on a first leg of a trip,
determine a return route for a second leg of the trip based on the driven route of the first leg of the trip,
determine a first location area that surrounds the first location at a first location radius,
receive a request from within the first location area,
determine a number of active passengers and a number of passive passengers within the first location area, wherein the active passengers are passengers that are actively seeking a ride in the vehicle and the passive passengers are passengers holding or otherwise associated with a personal electronic device for which a probability of becoming the active passengers is above a passenger threshold,
autonomously return to the first location from the second location at the first speed on the second leg of the trip based on the number of active passengers and the number of passive passengers within the first location area, and the determined return route in response to receiving the request from within the first location area and determining that, based on the signal received from the occupant detection sensor, the vehicle is unoccupied at the second location, and remain at the second location in absence of receiving the request from within the first location area.

14. The system of claim 13, wherein the processor-readable instructions further cause the system to:
autonomously return to the first location from the second location using the determined return route based on a number of autonomous vehicles at the first location.

15. The system of claim 13, wherein the processor-readable instructions further cause the system to:
record a secondary route from the second location to a third location,
autonomously return to the first location from the third location using the determined return route and the recorded secondary route in response to determining that, based on the signal received from the occupant detection sensor, the vehicle is unoccupied at the third location.

16. The system of claim 13, wherein the processor-readable instructions further cause the system to:
autonomously return to the first location from the second location using the determined return route based on a number of autonomous vehicles within the first location area.

17. The system of claim 13, wherein the processor-readable instructions further cause the system to:
autonomously return to the first location from the second location using the determined return route based on a number of active passengers or a number of passive passengers within the first location area.

18. A method of autonomously moving a vehicle from a second location to a first location, the method comprising:
capturing image data of an external environment and vehicle data as a user drives the vehicle from the first location to the second location on a first leg of a trip at a first speed;
detecting a presence of an occupant and a location of the occupant within the vehicle at the second location;
determining an occupancy status of the vehicle at the second location;
processing the image data of the first leg of the trip to determine a route from the second location to the first location for a second leg of the trip;
processing the vehicle data of the first leg of the trip to determine a driving characteristic from the second location to the first location for the second leg of the trip;
determining a first location area that surrounds the first location at a first location radius;
receiving a request from within the first location area;
determining a number of active passengers and a number of passive passengers within the first location area, wherein the active passengers are passengers that are actively seeking a ride in the vehicle and the passive passengers are passengers holding or otherwise associated with a personal electronic device for which a probability of becoming the active passengers is above a passenger threshold;
autonomously returning from the second location to the first location in response to receiving the request from within the first location area on the second leg of the trip based on the number of active passengers and the number of passive passengers within the first location area, and the processed image data and the processed vehicle data in response to receiving the request from within the first location area and determining that the occupancy status of the vehicle at the second location indicates that the vehicle is unoccupied; and
remaining at the second location in absence of receiving the request from within the first location area.

19. The method of claim 18, further comprising:
capturing one or more of lidar data, sonar data, and radar data about the external environment using one or more of a lidar sensor, a sonar sensor, and a radar sensor;
processing one or more of the lidar data, sonar data, and radar data to determine a route from the second location to the first location; and
autonomously travelling from the second location to the first location using the processed image data and one or more of the lidar data, sonar data, and radar in response to determining that the occupancy status of the vehicle at the second location indicates that the vehicle is unoccupied.

20. The method of claim 18, further comprising:
determining a demand of vehicle rides for the first location and a demand of vehicle rides for a third location;
determining whether the demand of the third location is greater than the demand of the first location; and
travelling to the third location in response to the demand of the third location being greater than the demand of the first location.

* * * * *

UNITED STATES PATENT AND TRADEMARK OFFICE
CERTIFICATE OF CORRECTION

PATENT NO. : 12,055,936 B2
APPLICATION NO. : 16/442856
DATED : August 6, 2024
INVENTOR(S) : Christopher Gregg et al.

It is certified that error appears in the above-identified patent and that said Letters Patent is hereby corrected as shown below:

In the Claims

In Column 20, Line(s) 60, Claim 13, after "location", delete "at the first speed".

Signed and Sealed this
Twenty-fourth Day of September, 2024

*Katherine Kelly Vidal*

Katherine Kelly Vidal
*Director of the United States Patent and Trademark Office*